Patented May 11, 1937

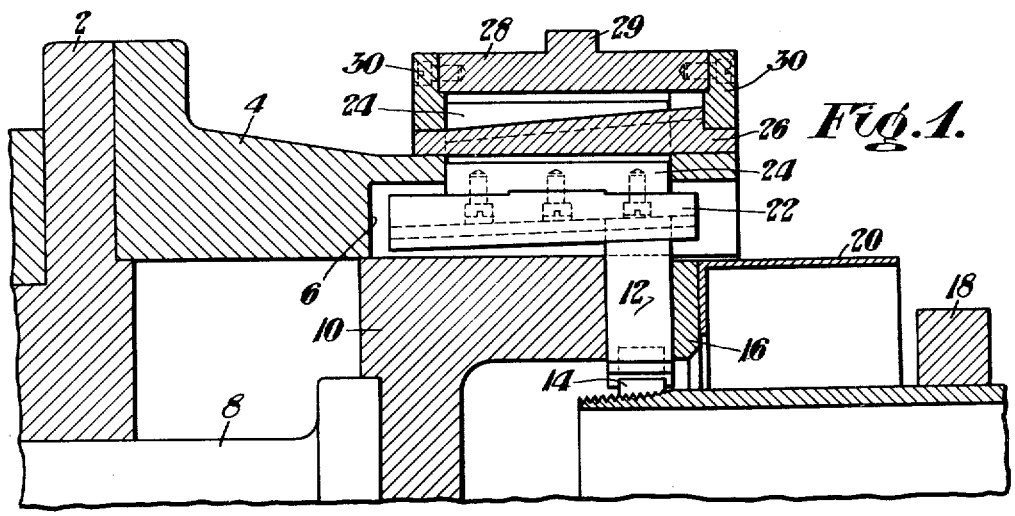
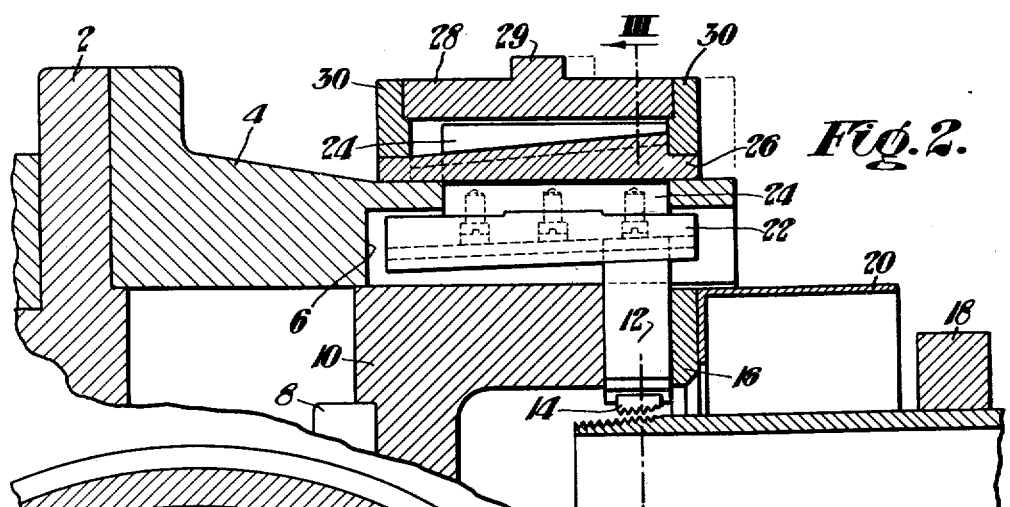
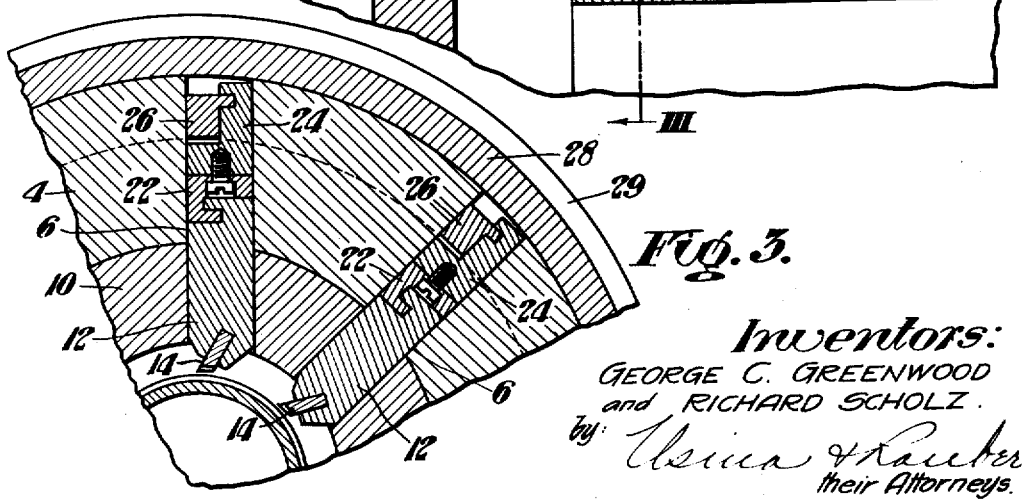

2,079,853

UNITED STATES PATENT OFFICE 2,079,853

THREADING APPARATUS

George C. Greenwood and Richard Scholz, Lorain, Ohio, assignors to National Tube Company, a corporation of New Jersey Application October 26, 1936, Serial No. 107,706

9 Claims. (Cl. 10—95)

This invention relates to threading apparatus and particularly refers to thread-cutting dies that are provided with movable thread-cutting means.

One object of this invention is to provide an improved type of thread-cutting apparatus which can rapidly be withdrawn from the object being threaded.

The above and further objects will be apparent from the following description and the accompanying drawing in which:

Figure 1 is a longitudinal sectional elevation of one embodiment of my invention, showing the chasers thereof in contact with a pipe.

Figure 2 is a longitudinal sectional elevation, similar to Figure 1, showing the chasers withdrawn from the pipe.

Figure 3 is a transverse sectional elevation, broken away at the sides, on line III—III of Figure 2.

Referring more particularly to the accompanying drawing the number 2 indicates a spindle which preferably rotates in a fixed plane. A hollow die-body 4, having spaced apertures 6 which extend in a radial direction therethrough, is secured to and rotates with the spindle 2. A lead screw 8 projects from the spindle 2 and rotates at the same speed as the spindle. The axis of the lead screw 8 coincides with the axis of the spindle 4 and the lead screw 8 is, if desired, provided with a rapid return motion. Means such as a sleeve or, more accurately, a chaser control sleeve 10, is secured to the lead screw 8 and slidably received in the die-body 4. Chasers 12 are carried by the chaser control sleeve 10 in such a manner that they can move perpendicularly to the axis of the spindle 8. The outer ends of the chasers 12 project into the apertures 6. The chasers 12 preferably extend in a radial direction and the inner ends thereof extend into the bore of the chaser control sleeve 10 and are provided with chaser inserts 14. The chaser inserts 14 can be designed to cut tapered threads as shown in Figure 1. The chasers 12 are positioned equi-distant from the axis of the spindle 8.

The apertures 6 are of such size that the chasers 12 can move both longitudinally and vertically therein. As both the die-body 4 and the chaser control sleeve 10 are rotating at the same revolutionary speed there is no relative rotational movement between them. The chasers 12 are preferably retained in place by means of a chaser retainer ring 16, as shown in the drawing.

In order to control the pipe or other object to be threaded, a universal pipe grip 18 is associated with the chaser control sleeve 10. The universal pipe grip 18 is adapted to secure the objects to be threaded in alignment with the axis of the spindle 2. A chip guard 20 is preferably carried by the chaser control sleeve 10 and extends outwardly therefrom.

The vertical positions of the chasers 12 are controlled by taper or chaser control bars 22 to which the chasers 12 are connected by a sliding interlock. The sliding interlock connection is tapered, as shown, when the chaser inserts 14 are to cut tapered threads. The taper control bars 22 are held in the apertures 6 in the die-body 4. The chasers 12 can move only longitudinally in the taper control bars 22 but the taper control bars 22 are capable only of movement perpendicular to the axis of the spindle 8. Collapsing control bars 24 which are substantially L-shaped in cross-section are secured to the taper control bars 22 and held in the die-body 4 so that they can move only perpendicularly to the axis of the spindle 8. The collapsing control bars 24 extend beyond the circumference of the die-body 4. The taper control bars 22 and the collapsing control bars 24 are assembled as a unit and can be integrally constructed, if desired.

Means are provided to control the vertical positions of the collapsing control bars 24 and thereby the positions of the chasers 12. These means include wedges or collapsing control wedges 26, which are mounted on the inside surface of the longer arms of the collapsing control bars 24 by tapered sliding interlocks. The collapsing control wedges 26 are totally outside the die-body 4 and are longer than the openings of the apertures 6 in the circumference of the die-body 4 so that they can bear upon the surface of the die-body 4. Then, vertical motion can be given the chasers 12 by moving the collapsing control wedges 26 longitudinally due to the tapered sliding interlock connection between the collapsing control wedge 26 and the collapsing control bar 24 to which the chasers 12 are secured.

In order to keep the collapsing control wedges 26 bearing upon the die-body 4 and to provide convenient means for controlling the longitudinal positions thereof, a chaser collapsing sleeve 28 provided with a flange 29 is positioned around the die-body 4 and the collapsing control wedges 26. The chaser collapsing sleeve 28 is mounted on the die-body 4 for limited longitudinal movement by any suitable means such as sleeve retainer rings 30 which are adapted to unify the movement of the collapsing control wedges 26 and the chaser collapsing sleeve 28. The chaser collapsing sleeve 28 can be moved approximately one inch in a longitudinal direction on the die-body 4 and, of course, carries the collapsing control wedges 26 with it. However, the collapsing control bars 24 can move only perpendicularly to the axis of the spindle 8 and, due to the tapered interlock connection between the collapsing control bars 24 and the collapsing control wedges 26, are moved in that direction by longitudinal movement of the chaser collapsing sleeve 28. This novel construction thereby provides means by which the chaser inserts 14 can rapidly and positively be moved in a direction perpendicular to the axis of the object being threaded. The movement given the chaser collapsing sleeve 28 can be made to be such that it pulls the chaser inserts 14 from the threaded object after sufficient threads have been cut thereon. Longitudinal movement can be given the chaser collapsing sleeve 28, when desired, by a trip finger (not shown) or other suitable means which can engage with the flange 29.

While we have shown and described one specific form of the invention, it will be appreciated that various modifications thereof can be made without departing from the scope of the invention as defined by the following claims.

We claim:

1. Apparatus of the class described comprising a spindle, a hollow die body secured to said spindle, a lead screw rotated at the same speed as said spindle, means slidably received in said die body and engage with said lead screw, chasers associated with said means and provided with thread cutting means in combination with chaser control bars held in said die body for movement perpendicular to the axis of said spindle and connected to said chasers by sliding interlocks, a wedge mounted on one side of each of said chaser control bars by a tapered sliding interlock, and means positioning said wedges for limited longitudinal movement on said die body.

2. Apparatus of the class described comprising, the combination of a spindle, a hollow die body secured to said spindle, a lead screw rotated at the same speed as said spindle, means slidably received in said die body and engaged with said lead screw, chasers associated with said means and provided with thread cutting means, chaser control bars held in said die body for movement perpendicular to the axis of said spindle and connected to said chasers by sliding interlocks, a wedge mounted on one side of each of said chaser control bars by a tapered sliding interlock, a chaser collapsing sleeve around said wedges and said die body and means positioning said chaser collapsing sleeve for limited longitudinal movement on said die body so that said wedge is moved therewith whereby said chaser control bars are moved perpendicularly to the axis of said spindle and said chasers secured thereto receive the identical movement given said chaser control bars.

3. Apparatus of the class described comprising the combination of a spindle, a hollow die body secured to said spindle, a lead screw rotated at the same speed as said spindle, means slidably received in said die body and engaged with said lead screw, chasers associated with said means and provided with thread cutting means, means for rapidly and positively moving said chasers perpendicularly to the axis of said spindle, said second named means including, chaser control bars held in said die body for movement perpendicular to the axis of said spindle and connected to said chasers by sliding interlocks, a wedge mounted on one side of each of said chaser control bars by a tapered sliding interlock, a chaser collapsing sleeve around said wedges and said die body and means positioning said chaser collapsing sleeve for limited longitudinal movement on said die body so that said wedge is moved therewith.

4. Apparatus of the class described comprising the combination of a spindle rotating in a fixed plane, a hollow die body secured to said spindle, a lead screw rotated at the same speed as said spindle, means slidably received in said die body and engaged with said lead screw, chasers associated with said means and chaser inserts adapted to cut tapered threads carried by said chasers, means for rapidly and positively moving said chasers perpendicularly to the axis of said spindle, said second named means including chaser control bars held in said die body for movement perpendicular to the axis of said spindle and connected to said chasers by tapered sliding interlocks, a wedge mounted on one side of each of said chaser control bars by a tapered sliding interlock, a chaser collapsing sleeve around said wedges and said die body and means positioning said chaser collapsing sleeve for limited longitudinal movement on said die body so that said wedge is moved therewith.

5. In a pipe threading machine the combination of a spindle, a hollow die body associated with said spindle, a lead screw driven at the same rotational speed as said spindle, a chaser control sleeve slidably received in said die body and engaged with said lead screw, a plurality of chasers carried by said chaser control sleeve, chaser inserts mounted on said chasers and provided with thread cutting surfaces, chaser control bars connected to said chasers by a sliding interlock, collapsing control bars secured to said chaser control bars and held in said die body for movement perpendicular to the axis of said spindle, collapsing control wedges mounted on the sides of said collapsing control bars by a tapered sliding interlock, a chaser collapsing sleeve surrounding said collapsing control bars and mounted on said die body for limited longitudinal movement and sleeve retainer rings firmly holding said collapsing control wedges in said chaser collapsing sleeve.

6. In a pipe threading machine the combination of a spindle, a hollow die body associated with said spindle, a lead screw driven at the same rotational speed as said spindle, a chaser control sleeve slidably received in said die body and engaged with said lead screw, a plurality of chasers carried by said chaser control sleeve, chaser inserts mounted on said chasers and provided with thread cutting surfaces, chaser control bars connected to said chasers by a sliding interlock, collapsing control bars secured to said chaser control bars and held in said die body for movement perpendicular to the axis of said spindle, collapsing control wedges mounted on the sides of said collapsing control bars by a tapered sliding interlock, a chaser collapsing sleeve surrounding said collapsing control bars and mounted on said die body for limited longitudinal movement and sleeve retainer rings firmly holding said collapsing control wedges in said chaser collapsing sleeve so that by longitudinal movement of said chaser collapsing sleeve said collapsing control wedges are moved longitudinally whereby said collapsing control bar, said chaser control bar, said chaser and said chaser inserts are all moved perpendicularly in relation to the axis of said spindle.

7. In a pipe threading machine adapted to cut serts secured to said chasers and provided with tating in a fixed plane, a hollow die body associated with said spindle, a lead screw driven at the same rotational speed as said spindle, a chaser control sleeve slidably received in said die body and engaged with said lead screw, a plurality of chasers carried by said chaser control sleeve, a chaser retaining ring securing said chasers in said chaser control sleeve, chaser inserts mounted on said chasers and provided with tapered thread cutting surfaces, taper control bars connected to said chasers by a tapered sliding interlock, collapsing control bars secured to said taper control bars and held in said die body for movement perpendicular to the axis of said spindle, collapsing control wedges mounted on the sides of said collapsing control bars by a tapered sliding interlock, a chaser collapsing sleeve surrounding said collapsing control bars and mounted on said die body for limited longitudinal movement and sleeve retainer rings firmly holding said collapsing control wedges in said chaser collapsing sleeve so that by longitudinal movement of said chaser collapsing sleeve said collapsing control wedges are moved longitudinally whereby said collapsing control bar, said taper control bar, said chaser and said chaser inserts are all moved perpendicularly in relation to the axis of said spindle.

8. In a pipe threading machine adapted to cut tapered threads the combination of, a spindle rotating in a fixed plane, a hollow die body associated with said spindle, a lead screw driven at the same rotational speed as said spindle, a chaser control sleeve slidably received in said die body and engaged with said lead screw, a plurality of chasers carried by said chaser control sleeve, a chaser retaining ring securing said chasers in said chaser control sleeve, chaser inserts secured to said chasers and provided with tapered threads the combination of, a spindle ro-tapered thread cutting surfaces, means associated with said machine for fixedly positioning a pipe between said chaser inserts, a chip guard secured to said chaser retaining ring and extending outwardly from said machine, taper control bars connected to said chasers by a tapered sliding interlock, collapsing control bars secured to said taper control bars and held in said die body for movement perpendicular to the axis of said spindle, collapsing control wedges mounted on the sides of said collapsing control bars by tapered sliding interlocks, a chaser collapsing sleeve surrounding said collapsing control bars and mounted on said die body for limited longitudinal movement and sleeve retainer rings firmly holding said collapsing control wedges in said chaser collapsing sleeve so that by longitudinal movement of said chaser collapsing sleeve said collapsing control wedges are moved longitudinally whereby said collapsing control bar, said taper control bar, said chaser and said chaser inserts are all moved perpendicularly in relation to the axis of said spindle.

9. Means for rapidly changing the radial positions of chasers in a threading machine including chaser control bars connected to said chasers by a sliding interlock, collapsing control bars secured to said chaser control bars and positioned for radial movement in said threading machine, collapsing control wedges mounted on the sides of said collapsing control bars by a tapered sliding interlock, a chaser collapsing sleeve surrounding said collapsing control bars and carried by said threading machine to permit limited longitudinal movement thereon and sleeve retainer rings firmly holding said collapsing control wedges in said chaser collapsing sleeve.

GEORGE C. GREENWOOD.
RICHARD SCHOLZ.

CERTIFICATE OF CORRECTION.

Patent No. 2,079,853. May 11, 1937.

GEORGE C. GREENWOOD, ET AL.

It is hereby certified that error appears in the printed specification of the above numbered patent requiring correction as follows: Page 3, first column, line 1, claim 7, strike out the syllable and words "serts secured to said chasers and provided with" and insert instead the words and syllable tapered threads the combination of, a spindle ro-; and second column, line 1, claim 8, strike out "tapered threads the combination of, a spindle ro-" and insert instead the syllable and words serts secured to said chasers and provided with; and that the said Letters Patent should be read with these corrections therein that the same may conform to the record of the case in the Patent Office.

Signed and sealed this 15th day of March, A. D. 1938.

Henry Van Arsdale,
Acting Commissioner of Patents.

(Seal)

serts secured to said chasers and provided with tapered threads the combination of, a spindle rotating in a fixed plane, a hollow die body associated with said spindle, a lead screw driven at the same rotational speed as said spindle, a chaser control sleeve slidably received in said die body and engaged with said lead screw, a plurality of chasers carried by said chaser control sleeve, a chaser retaining ring securing said chasers in said chaser control sleeve, chaser inserts mounted on said chasers and provided with tapered thread cutting surfaces, taper control bars connected to said chasers by a tapered sliding interlock, collapsing control bars secured to said taper control bars and held in said die body for movement perpendicular to the axis of said spindle, collapsing control wedges mounted on the sides of said collapsing control bars by a tapered sliding interlock, a chaser collapsing sleeve surrounding said collapsing control bars and mounted on said die body for limited longitudinal movement and sleeve retainer rings firmly holding said collapsing control wedges in said chaser collapsing sleeve so that by longitudinal movement of said chaser collapsing sleeve said collapsing control wedges are moved longitudinally whereby said collapsing control bar, said taper control bar, said chaser and said chaser inserts are all moved perpendicularly in relation to the axis of said spindle.

8. In a pipe threading machine adapted to cut tapered threads the combination of, a spindle rotating in a fixed plane, a hollow die body associated with said spindle, a lead screw driven at the same rotational speed as said spindle, a chaser control sleeve slidably received in said die body and engaged with said lead screw, a plurality of chasers carried by said chaser control sleeve, a chaser retaining ring securing said chasers in said chaser control sleeve, chaser inserts secured to said chasers and provided with tapered thread cutting surfaces, means associated with said machine for fixedly positioning a pipe between said chaser inserts, a chip guard secured to said chaser retaining ring and extending outwardly from said machine, taper control bars connected to said chasers by a tapered sliding interlock, collapsing control bars secured to said taper control bars and held in said die body for movement perpendicular to the axis of said spindle, collapsing control wedges mounted on the sides of said collapsing control bars by tapered sliding interlocks, a chaser collapsing sleeve surrounding said collapsing control bars and mounted on said die body for limited longitudinal movement and sleeve retainer rings firmly holding said collapsing control wedges in said chaser collapsing sleeve so that by longitudinal movement of said chaser collapsing sleeve said collapsing control wedges are moved longitudinally whereby said collapsing control bar, said taper control bar, said chaser and said chaser inserts are all moved perpendicularly in relation to the axis of said spindle.

9. Means for rapidly changing the radial positions of chasers in a threading machine including chaser control bars connected to said chasers by a sliding interlock, collapsing control bars secured to said chaser control bars and positioned for radial movement in said threading machine, collapsing control wedges mounted on the sides of said collapsing control bars by a tapered sliding interlock, a chaser collapsing sleeve surrounding said collapsing control bars and carried by said threading machine to permit limited longitudinal movement thereon and sleeve retainer rings firmly holding said collapsing control wedges in said chaser collapsing sleeve.

GEORGE C. GREENWOOD.
RICHARD SCHOLZ.

CERTIFICATE OF CORRECTION.

Patent No. 2,079,853.   May 11, 1937.

GEORGE C. GREENWOOD, ET AL.

It is hereby certified that error appears in the printed specification of the above numbered patent requiring correction as follows: Page 3, first column, line 1, claim 7, strike out the syllable and words "serts secured to said chasers and provided with" and insert instead the words and syllable tapered threads the combination of, a spindle ro-; and second column, line 1, claim 8, strike out "tapered threads the combination of, a spindle ro-" and insert instead the syllable and words serts secured to said chasers and provided with; and that the said Letters Patent should be read with these corrections therein that the same may conform to the record of the case in the Patent Office.

Signed and sealed this 15th day of March, A. D. 1938.

(Seal)

Henry Van Arsdale,
Acting Commissioner of Patents.

CERTIFICATE OF CORRECTION.

Patent No. 2,079,853. May 11, 1937.

GEORGE C. GREENWOOD, ET AL.

It is hereby certified that error appears in the printed specification of the above numbered patent requiring correction as follows: Page 3, first column, line 1, claim 7, strike out the syllable and words "serts secured to said chasers and provided with" and insert instead the words and syllable tapered threads the combination of, a spindle ro-; and second column, line 1, claim 8, strike out "tapered threads the combination of, a spindle ro-" and insert instead the syllable and words serts secured to said chasers and provided with; and that the said Letters Patent should be read with these corrections therein that the same may conform to the record of the case in the Patent Office.

Signed and sealed this 15th day of March, A. D. 1938.

(Seal)

Henry Van Arsdale,
Acting Commissioner of Patents.